United States Patent [19]
Batistic et al.

[11] Patent Number: 5,632,531
[45] Date of Patent: May 27, 1997

[54] METHOD AND CIRCUIT CONFIGURATION FOR DETERMINING THE PEDAL FORCE AS A CONTROL QUANTITY FOR A BRAKE SYSTEM WITH ANTI-LOCK CONTROL

[75] Inventors: Ivica Batistic, Frankfurt am Main; Axel Christen, Mühlheim, both of Germany

[73] Assignee: ITT Automotive Europe GmbH, Frankfurt, Germany

[21] Appl. No.: 500,848

[22] PCT Filed: Jan. 21, 1994

[86] PCT No.: PCT/EP94/00153

§ 371 Date: Nov. 8, 1995

§ 102(e) Date: Nov. 8, 1995

[87] PCT Pub. No.: WO94/18041

PCT Pub. Date: Aug. 18, 1994

[30] Foreign Application Priority Data

Feb. 4, 1993 [DE] Germany ................. 43 03 206

[51] Int. Cl.[6] ........................................ B60T 8/34
[52] U.S. Cl. ................. 303/113.4; 303/155; 303/166; 303/DIG. 4
[58] Field of Search ..................... 303/155, 113.4, 303/166, DIG. 3, DIG. 4; 364/426.01, 426.02

[56] References Cited

U.S. PATENT DOCUMENTS

| | | |
|---|---|---|
| 4,057,301 | 11/1977 | Foster ................. 303/113.4 X |
| 4,768,841 | 9/1988 | Watanabe ................. 303/113.4 |
| 5,230,549 | 7/1993 | Osada et al. ................. 303/113.4 X |

FOREIGN PATENT DOCUMENTS

| | | |
|---|---|---|
| 0265623 | 5/1988 | European Pat. Off. . |
| 3124755 | 1/1983 | Germany . |
| 3241039 | 5/1984 | Germany . |
| 3813173 | 11/1989 | Germany . |
| 3819490 | 12/1989 | Germany . |
| 4015866 | 11/1991 | Germany . |
| 4020449 | 1/1992 | Germany . |
| 4032876 | 4/1992 | Germany . |
| 4037142 | 5/1992 | Germany . |
| 4110494 | 10/1992 | Germany . |
| 3096469 | 4/1991 | Japan . |
| 2219056 | 11/1989 | United Kingdom . |
| 9105686 | 5/1991 | WIPO . |

*Primary Examiner*—Peter M. Poon
*Attorney, Agent, or Firm*—Thomas N. Twomey; J. Gordon Lewis

[57] ABSTRACT

To determine the pedal force as a control quantity for a brake system with anti-lock control, the drive motor of a hydraulic pump is switched over to generator operation during braking with anti-lock control, and the magnitude of the generator voltage and its fade-out behavior is evaluated. The hydraulic pump serves to return the pressure fluid which was discharged from the wheel brake for pressure reduction, or it serves for the supply of auxiliary pressure. The approximate supply pressure depending on the pedal force can be determined by the generator voltage and the fade-out behavior.

16 Claims, 2 Drawing Sheets

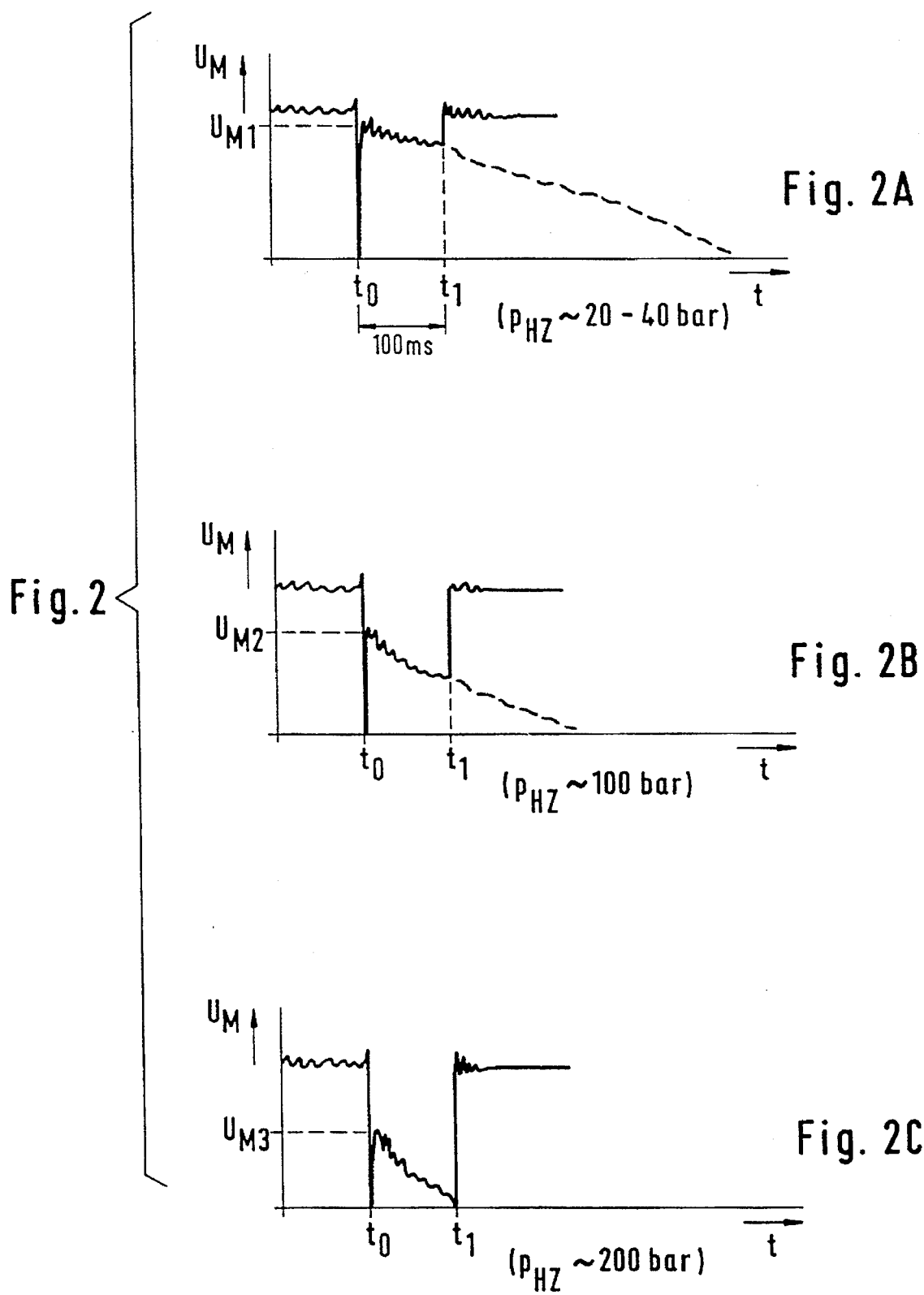

METHOD AND CIRCUIT CONFIGURATION FOR DETERMINING THE PEDAL FORCE AS A CONTROL QUANTITY FOR A BRAKE SYSTEM WITH ANTI-LOCK CONTROL

This application is the U.S. national-phase application of PCT International Application No. PCT/EP94/00153.

BACKGROUND OF THE INVENTION

The present invention relates to a method for determining the pedal force as a control quantity during braking with anti-lock control for a brake system with anti-lock control which includes as electromotively driven hydraulic pump. The electromotively driven hydraulic pump serves as a return of pressure fluid discharged from the wheel brakes during braking pressure control or for the generation of auxiliary pressure. The present invention also relates to a circuit configuration for implementing the method, and includes sensors for determining the wheel rotational behavior and an electronic controller for: (a) evaluating the sensor signals, (b) generating braking pressure control signals, and (c) actuating the electromotively driven hydraulic pump which serves for the return of pressure fluid or the generation of auxiliary pressure.

It is difficult to determine the pedal force and the resulting supply pressure in anti-lock brake systems. Of course, it would, in principle, be possible to determine the pedal force by way of force sensors, for example, by known wire strain gages. However, the complexity of such measuring apparatus would be great, in particular, because monitoring devices would be required in addition. As a result, such measuring apparatus is avoided for cost reasons, although the supply pressure takes major effect on braking pressure control. Therefore, it would be important for the control quantity and control comfort to have data about the supply pressure.

Japanese patent application JP-A-0 3096469 teaches monitoring the voltage variation directly after deactivation of the drive motor of a hydraulic pump, which pump is included in an anti-lock system, in order to detect defects or pressure fluid leakages. Either the steep or the gradual decline of the drive motor voltage is evaluated as a criterion.

Further, it is disclosed in DE-A-38 19 490 to monitor the electromotively driven hydraulic pump of an anti-lock brake system by means of sensors which determine and evaluate measured values indicative of the actual operating condition of the electric motor from time to time or continuously during operation of the hydraulic pump. This way, the operability of the hydraulics is monitored without direct measurement of the pressure.

SUMMARY OF THE INVENTION

An object of the present invention is to determine the force applied to the brake pedal during braking with anti-lock control and to thereby determine the supply pressure caused by this force for taking the supply pressure into account in the control operation. It is evident that a possible increased expenditure in manufacturing the brake system should be as low as possible.

It has been discovered that this object can be achieved by a method of the previously mentioned type, the special features being that, during braking with anti-lock control, the drive motor of the hydraulic pump is deactivated or switched over to generator operation for a predetermined time for measuring the supply pressure, and the magnitude of the generator voltage and the variation or fade-out behavior of the generator voltage is assessed to determine the approximate supply pressure as a function of the pedal force.

Thus, the present invention is based on the knowledge that information about the so-called supply pressure or the instantaneous brake pedal force can be acquired from a very short interruption in the actuation of the pump drive motor, which interruption does not disturb the function, or a short-time switch-over to generator operation. As will be seen in the following description of an embodiment of the present invention, the generator voltage, after the deactivation and its fade-out behavior, is influenced considerably by power requirements which, in turn, depend on the supply pressure or the pedal force, respectively.

In a favorable aspect of the method according to the present invention, the intervals for measuring the supply pressure are predetermined by a sequence of short pulses. During the pulses, the magnitude and the fade-out behavior of the generator voltage is evaluated. It has proved expedient that the short pulses follow one after the other in the order of 0.5 to 1 second (1 to 2 hertz) and that the duration of the pulses ranges between 30 and 200 milliseconds. The interruption in the operation or the disconnection of the pump for such short intervals does not disturb anti-lock control operations.

According to another aspect of the present invention for a brake system wherein the hydraulic pump is actuated by a pulse train, the pump motor is changed over to generator operation after each actuating pulse. The magnitude and the fading-out of the generator voltage, in turn, contain the desired pieces of information.

Further, according to the present invention, one or more of the following control quantities are varied or adjusted or preadjusted in response to the determined approximate supply pressure:

braking pressure increase gradient duration of the braking pressure increase pulses pulse duration/pulse pause ratio of the braking pressure increase pulses actuation of the braking pressure reduction valves control frequency.

In another case, it is expedient to vary the feed performance or (average) rotational speed of the hydraulic pump in response to the supply pressure.

A circuit configuration for implementing the method according to the present invention includes a measuring circuit which: (a) switches the drive motor of the hydraulic pump over to generator operation during braking with anti-lock control for one or a sequence of predetermined intervals, (b) measures the magnitude and the fade-out behavior of the generator voltage during these intervals, (c) evaluates these measured quantities for determining the approximate supply pressure, and (d) supplies a signal representative of the supply pressure to the electronic controller.

Further features, advantages and possible applications of the present invention will be seen in the following description with reference to the accompanying drawings.

BRIEF DESCRIPTION OF THE INVENTION

In the drawings:

FIG. 1 is a block diagram of the most important electronic units of a circuit configuration according to the present invention, and FIG. 2 is a series of waveform diagrams showing the variation of the generator voltage in three characteristic situations, for example, at a low supply pressure (FIG. 2A), at a medium supply pressure (FIG. 2B) and at a high supply pressure (FIG. 2C).

DETAILED DESCRIPTION OF THE INVENTION

Figure 1:
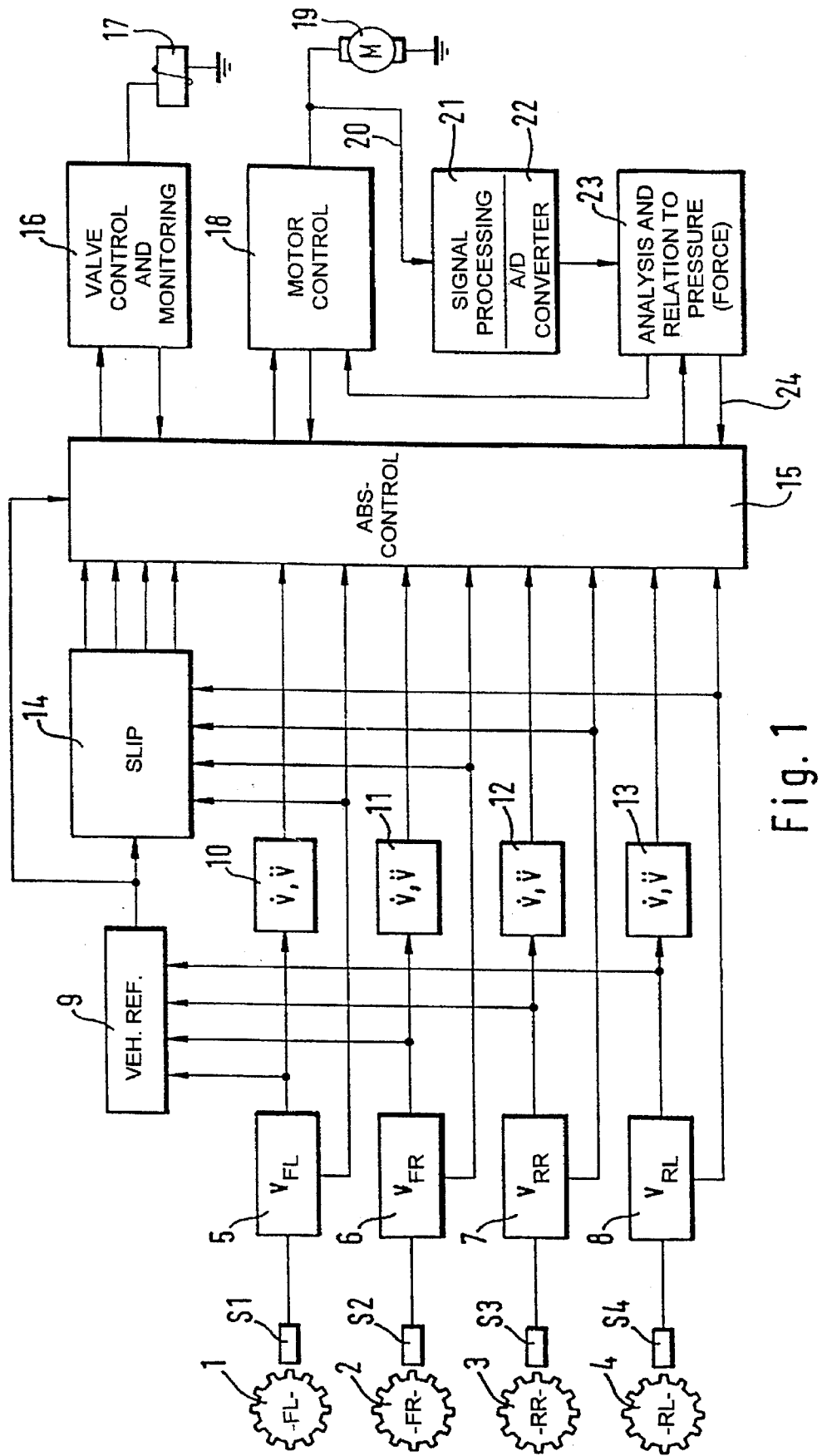

The circuit shown in FIG. 1 is included in an electronically controlled anti-lock system. Among the most important information for the control circuit is the rotational behavior of the individual vehicle wheels. These pieces of information are obtained in a known fashion by way of wheel sensors S1 to S4 which, in cooperation with a pulse generator or a toothed disc co-rotating with the wheel (toothed discs 1–4 are shown), generate a pulse train. The frequency of the pulse train corresponds to the wheel rotational behavior.

After conditioning the wheel sensor signals in conditioning circuits 5–8, a so-called vehicle reference speed is formed by logical combining in a circuit 9. Further signals required for the control are formed by differentiation of the individual wheel speed signals in circuits 10–13. The slip of each individual wheel is determined in another circuit 14 by comparing the speed of the individual wheels with the common vehicle reference speed. In another sophisticated electronic circuit 15, which comprises one or more microcomputers or microcontrollers, braking pressure control signals are generated from slip (circuit 14), vehicle reference speed (circuit 9), wheel acceleration and jerk (circuits 10–13). A switching unit 16 in FIG. 1 represents the output stages for the actuation of electrically operable hydraulic valves 17 which (in a known fashion which will not be referred to in detail herein) are inserted into the brake lines of the brake system and keep the braking pressure constant, reduce it and reincrease it on commencement of anti-lock control. Reference numeral 17 represents a coil of one valve only. In known and conventional anti-lock systems, an inlet valve and an outlet valve is provided for braking pressure control for each individual wheel.

In addition, at least one hydraulic pump is required in an anti-lock system for returning the pressure fluid that is discharged from the wheel brakes in the braking pressure reduction phase to the master cylinder or in open-center systems for generating the auxiliary pressure. The electric drive motor of such a hydraulic pump or a motor-and-pump assembly is referred to by reference numeral 19 in FIG. 1. The associated electronic actuating circuit is referred to by reference numeral 18. The motor control 18 is also governed by output signals of the controller 15.

A measuring and evaluating circuit 21–23, essential for the present invention, serves to determine the approximate supply pressure which, in turn, depends on the force applied to the brake pedal. For this purpose, a signal is supplied to the motor actuating circuit 18 through the measuring and evaluating circuit 21 during braking with anti-lock control. The signal is in the form of a short pulse or a pulse train and serves to disconnect the drive motor 19 or to switch the drive motor 19 over to generator operation for a short time. The generator voltage $U_M$, initiated by the disconnecting or switch-over pulse, and its fade-out behavior are supplied to a signal-conditioning circuit 21 by way of a signal line 20. In the present case, an analog/digital converter 22 is connected to the signal-conditioning circuit 21. Finally, the output signal of the converter is analyzed in the evaluating circuit 23. The instantaneous situation and the approximate supply pressure are determined and the magnitude of the supply pressure is signalled to the controller for processing by way of a signal line 24. In the controller logic 15, the magnitude of the supply pressure is taken into account in the algorithm for calculating the valve-actuating signals, in particular, in the pressure increase algorithm. The approximate supply pressure which is determined according to the present invention is an important quantity for determining the pressure increase gradient which, in turn, is a factor taken into account in rating the pressure increase pulses, the duration of these pulses and/or the pulse duration/pulse pause ratio.

The actuation of the motor-pump assembly or the drive motor 19 by way of the motor control circuit 18 is also influenced by the magnitude of the supply pressure determined in the circuit 21–23.

The three waveform diagrams in FIGS. 2A, 2B and 2C illustrate the different magnitudes of the generator voltage $U_M$ and the different fade-out behavior depending on the supply pressure. The generator voltage $U_M$ on the electric motor 19 of the circuit in FIG. 1 is shown. In the situation to which FIG. 2A relates, the supply pressure or master cylinder pressure $p_{HZ}$ is in the order of approximately 20 to 40 bar. Thus, the supply pressure is comparatively low. After 100 milliseconds, the generator voltage $U_{M1}$ has decreased to roughly 80% of its original value prevailing at time $t_0$. The further variation of the generator voltage, which results when the motor remains switched off, is shown by dashed lines.

A medium supply pressure of roughly 100 bar prevails in the situation shown in FIG. 2B. The different fade-out behavior in comparison to the situation shown in FIG. 2A is unmistakable. After 100 milliseconds, the voltage has decreased to approximately 50% of its value which prevailed at the initial time $t_0$.

Finally, FIG. 2C shows a situation with a comparatively high supply pressure of roughly 200 bar. In this case, the generator voltage has practically decreased to zero after 100 milliseconds.

The control can be greatly improved by the method according to the present invention. Previously, it was impossible to take into account the actual pedal force. The control algorithms were set to a medium pedal force or a medium supply pressure, respectively. However, there are cases where braking operations with anti-lock control are impaired by the change in pedal force. Braking comfort suffers, or the stopping distance becomes longer than physically necessary. A high master cylinder pressure (i.e. supply pressure), which exceeds the locking pressure by far, caused by an excessive pedal force, will impair the comfort because the great difference between the pressure in the master cylinder and the pressure in the wheel brake results in a relatively high control frequency. The high pressure increase per pulse causes disturbing noises. These effects are proportional to the pressure difference. In addition, vibrations can be induced on the chassis.

A low supply pressure, which, however, is in excess of the locking pressure, in principle, inheres the risk of a reduced brake performance, because the pressure increase achieved per pressure increase pulse is relatively low due to the relatively small difference between the supply pressure and the pressure in the wheel brake.

Both effects, which are caused by a too high and a too low pedal pressure, are taken into account in practice by adapting the pressure increase algorithm. However, the controller needs a corresponding time to learn.

The voltage variation during the generator operation, or rather the magnitude of the generator voltage $U_M$, and the fade-out behavior of this voltage are greatly influenced by the power requirement of the electric motor. At low pedal force, the hydraulic pump (reference numeral 19 in FIG. 1) must return fluid only in opposition to a low pressure in the master cylinder or a low supply pressure, respectively. The situation shown in FIG. 2A will occur when the motor is switched off. However, in order to supply fluid during an anti-lock control operation in opposition to high pedal forces and, thus, a high supply pressure, great output of the hydraulic pump and, thus, its drive motor 19 is required. The behavior or the voltage variation during the measuring process according to the present invention is shown in FIG. 2C. FIG. 2B refers to a medium value or "standard value" which previously dictated the rating of the control.

During an anti-lock control operation, the locking pressure can be determined relatively precisely by way of plausibility criteria from the control variation, for example, the number of pressure increase pulses, etc. The same applies to the coefficient of friction. The present invention also provides information about the supply pressure so that the most important data for proportioning the braking pressure increase, for adjusting the desired control frequency, etc., are available. Thus, the method according to the present invention permits major improvement of anti-lock control operations without considerable extra effort.

We claim:

1. A circuit configuration for a brake system of a vehicle having anti-lock control for determining the pedal force as a control quantity during braking of the wheels of the vehicle, said circuit configuration comprising:

sensors for indicating the rotational behavior of the wheels of the vehicle;

an hydraulic pump assembly having a drive motor which serves at least as one of:
 (a) a pressure fluid return, and
 (b) a source of auxiliary pressure fluid;

an electronic controller circuit for:
 (a) evaluating the wheel rotational behavior of the wheels of the vehicle,
 (b) generating braking pressure control signals, and
 (c) actuating said drive motor; and a measuring circuit for:
 (a) switching said drive motor over to generator operation for a predetermined period of time,
 (b) measuring the magnitude and the fade-out behavior of the voltage of said drive motor during said predetermined period of time,
 (c) evaluating the magnitude and the fade-out behavior of the voltage of said drive motor during said predetermined period of time for determining an approximate supply pressure, and
 (d) supplying an indication of the supply pressure to said electronic controller circuit.

2. A circuit configuration for a brake system of a vehicle according to claim 1 wherein said predetermined period of time is one predetermined interval.

3. A circuit configuration for a brake system of a vehicle according to claim 1 wherein said predetermined period of time is a sequence of predetermined intervals.

4. A method for determining the pedal force as a control quantity during braking with anti-lock control, for a brake system with anti-lock control which includes an electromotively driven hydraulic pump for the return of pressure fluid discharged from the wheel brakes during braking pressure control or for the generation of auxiliary pressure, characterized in that, during braking with anti-lock control, a drive motor of the hydraulic pump is switched over to generator operation for a predetermined time for measuring the supply pressure, and the magnitude of the generator voltage and the variation or fade-out behavior of the generator voltage is assessed to determine in approximation the supply pressure as a function of the pedal force.

5. A method as claimed in claim 4, characterized in that the intervals for measuring the supply pressure are predetermined by a sequence of short pulses, in the duration of which the magnitude and the fade-out behavior of the generator voltage is evaluated.

6. A method as claimed in claim 5, characterized in that the short pulses follow one another in the order of 0.5 to 1 second and that the duration of the individual pulses ranges between 30 and 300 milliseconds.

7. A method as claimed in claim 6, for a brake system wherein the drive motor of the hydraulic pump is actuated by a pulse train, characterized in that the drive motor of the hydraulic pump is changed over to generator operation after each actuating pulse, and the magnitude and the fade-out behavior of the generator voltage is evaluated.

8. A method as claimed in claim 7 characterized in that one or more of the following control quantities are varied or adjusted or preadjusted in response to the supply pressure ($p_{HZ}$) determined in approximation:

braking pressure increase gradient duration of the braking pressure increase pulses pulse duration/pulse pause ratio of the braking pressure increase pulses actuation of the braking pressure reduction valves control frequency.

9. A method as claimed in claim 8, characterized in that the feed performance or rotational speed of the hydraulic pump is preset in response to the supply pressure.

10. A circuit configuration for implementing the method as claimed in claim 4, including sensors for determining the wheel rotational behavior and an electronic controller circuit for evaluating the sensor signals and for generating braking pressure control signals and for actuating the electromotively driven hydraulic pump which serves for pressure fluid return or for the generation of auxiliary pressure, characterized in that a measuring circuit disconnects the drive motor of the hydraulic pump during braking with anti-lock control for one or a sequence of predetermined intervals or switches over to generator operation, which measures the magnitude and the fade-out behavior of the generator voltage during these intervals, which evaluates these measured quantities for determining the supply pressure in approximation, and which supplies a signal representative of the supply pressure to the electronic controller circuit.

11. A method for determining the pedal force as a control quantity during braking with anti-lock control, for a brake system with anti-lock control, said method comprising the steps of:

providing a hydraulic pump assembly having a drive motor for at least one of:
 (a) returning pressure fluid discharged from wheel brakes of the vehicle during braking pressure control, and
 (b) generating auxiliary pressure;

switching said drive motor to generator operation for a predetermined period of time during braking with anti-lock control;

measuring the magnitude and the fade-out behavior of the voltage of said drive motor during said predetermined period of time; and assessing the variation and fade-out behavior of the voltage of said drive motor during said predetermined period of time to determine an approximate supply pressure as a function of the pedal force.

12. A method according to claim 11 wherein the predetermined period of time during which the magnitude and the fade-out behavior of the voltage of said drive motor is measured and assessed for determining the supply pressure is a sequence of short pulses.

13. A method according to claim 12 wherein the short pulses follow one another in the order of 0.5 to 1 second and the duration of the individual pulses ranges between 30 and 300 milliseconds.

14. A method according to claim 13 wherein said drive motor of said hydraulic pump assembly is actuated by a pulse train and said drive motor of said hydraulic pump assembly is switched over to generator operation after each actuating pulse.

15. A method according to claim 14 at least one of the following control quantities are affected in response to the approximate supply pressure:
   braking pressure increase gradient
   duration of the braking pressure increase pulses
   pulse duration/pulse pause ratio of the braking pressure increase pulses
   actuation of the braking pressure reduction valves
   control frequency.

16. A method according to claim 15 wherein average rotational speed of said hydraulic pump assembly is set in response to the supply pressure.

* * * * *